United States Patent [19]
Schutt et al.

[11] Patent Number: 5,545,987
[45] Date of Patent: Aug. 13, 1996

[54] MONITORING DEVICE FOR TENSION MEMBERS OF SOIL OR ROCK ANCHORS, COMPRESSION MEMBERS OF POLES, PRESTRESSING ELEMENTS FOR PRESTRESSED CONCRETE STRUCTURES AND BRIDGE CABLES

[75] Inventors: Karl Schutt, Langenfeld; Johann H. Hinken, Holle; Martin Klinger; Savtcho S. Tintchev, both of Bad Salzdetfurth, all of Germany

[73] Assignee: Suspa Spannbeton GmbH, Langenfeld, Germany

[21] Appl. No.: 170,931

[22] Filed: Dec. 21, 1993

[30] Foreign Application Priority Data

Dec. 23, 1992 [DE] Germany ................ 42 43 878.0

[51] Int. Cl.⁶ .................................. G01N 27/72
[52] U.S. Cl. .................................................. 324/219
[58] Field of Search ........................... 324/219, 209, 324/228, 240, 242, 248, 239; 73/779, 768, 785, 786

[56] References Cited

U.S. PATENT DOCUMENTS

| | | | |
|---|---|---|---|
| 3,742,757 | 7/1973 | Callahan | 73/768 |
| 3,781,663 | 12/1973 | Abarotin et al. | 324/262 |
| 3,796,091 | 3/1974 | Sevata | 73/779 |
| 4,139,822 | 2/1979 | Urich et al. | 324/219 |
| 4,289,024 | 9/1981 | Basham et al. | |
| 4,441,078 | 4/1984 | Lecomte | 324/219 |
| 4,573,013 | 2/1986 | Kosenberger et al. | 324/238 |
| 4,864,233 | 9/1989 | Harrison | 324/240 |
| 5,015,953 | 5/1991 | Ferguson et al. | 324/209 |
| 5,086,651 | 2/1992 | Westermo et al. | 324/209 |
| 5,180,969 | 1/1993 | Kwun et al. | 324/240 |
| 5,284,062 | 2/1994 | Ryffel | 73/768 |

FOREIGN PATENT DOCUMENTS

| | | |
|---|---|---|
| 0060061 | 9/1982 | European Pat. Off. . |
| 2193475 | 2/1974 | France . |
| 1484533 | 5/1969 | Germany . |
| 2437740 | 2/1975 | Germany . |
| 2922256 | 12/1979 | Germany ............... 324/209 |
| 2920886 | 6/1980 | Germany . |
| 3636322 | 5/1988 | Germany . |
| 8911727 | 4/1990 | Germany . |
| 4027020 | 3/1992 | Germany . |
| 4134787 | 4/1993 | Germany . |
| 6504541 | 10/1966 | Netherlands . |

OTHER PUBLICATIONS

Instrumentation Techniques for Strain Measurements in Concrete Pressure Vessels and Similar Structures by I. W. Hornby, Central Electricity Research Laboratories vol. 8, No. 3 (Jul. 1972).
Patent Abstracts of Japan, vol. 13, No. 358, Publication No. JP1119756, Application No. JP870277445.
Technical article by Miesseler and Wolff, published in Bautechnik, Issue No. 10, pp. 592–594.

Primary Examiner—Sandra L. O'Shea
Assistant Examiner—Roger Phillips
Attorney, Agent, or Firm—Dennison, Meserole, Pollack & Scheiner

[57] ABSTRACT

The monitoring device for structural elements, in particular for tension members of soil or rock anchors, compression members of poles, prestressing elements for prestressed concrete structures and bridge cables has at least one sensor conduit (15) disposed inside or outside of a structural element (1) for receiving at least one sensor (16), wherein the sensor (16) is disposed movably and/or releasably in the sensor conduit (15). An evaluation device (18) determines the presence of corrosion, cracks, overloads, overextensions and tension relaxation from the at least one sensor signal.

23 Claims, 4 Drawing Sheets

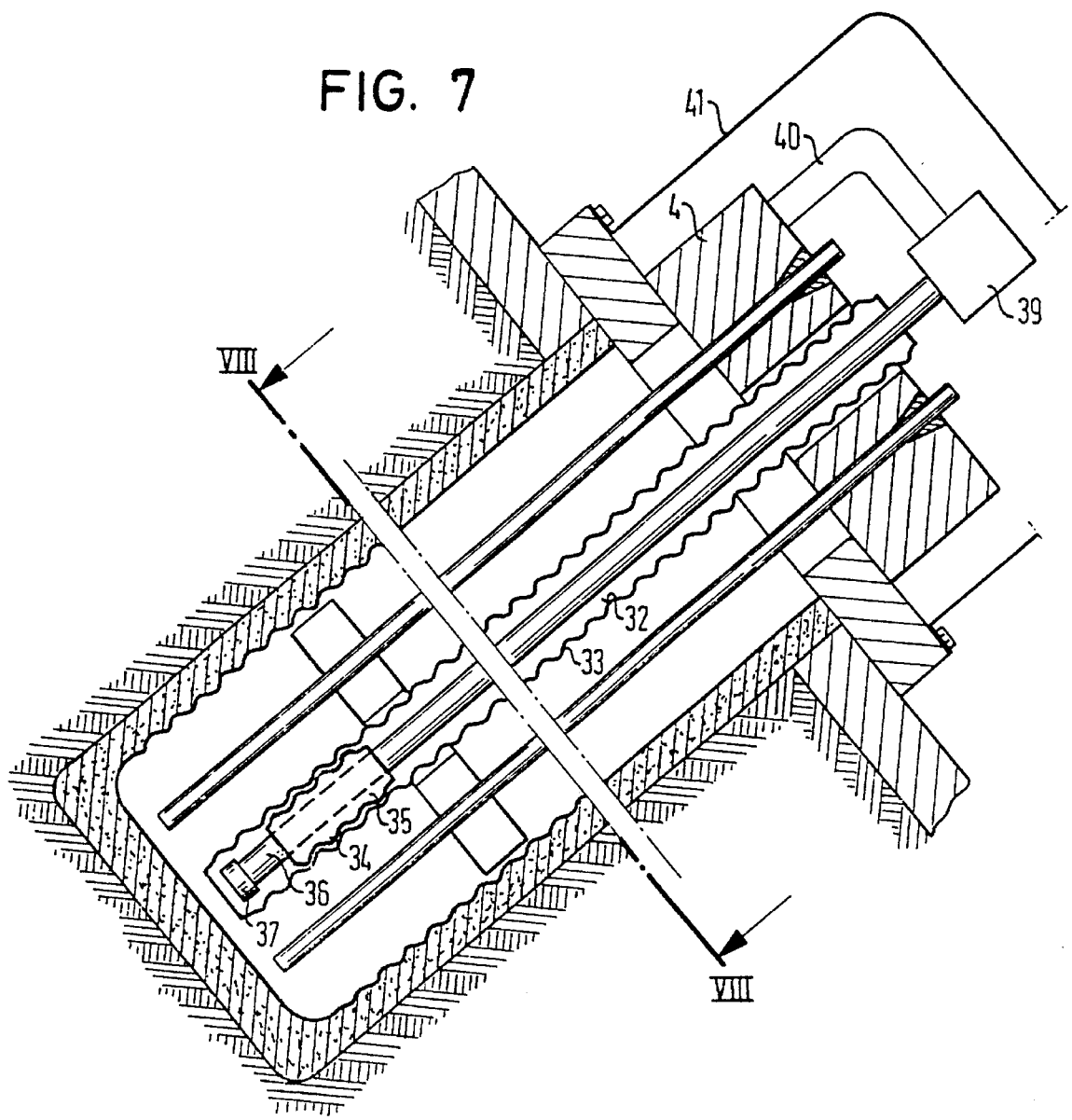
FIG. 7
FIG. 9
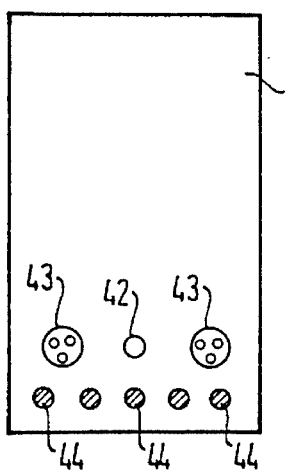
FIG. 8

MONITORING DEVICE FOR TENSION MEMBERS OF SOIL OR ROCK ANCHORS, COMPRESSION MEMBERS OF POLES, PRESTRESSING ELEMENTS FOR PRESTRESSED CONCRETE STRUCTURES AND BRIDGE CABLES

FIELD OF THE INVENTION

The invention relates to a monitoring device for structural elements, in particular for tension members of soil or rock anchors, compression members of poles, prestressing elements for prestressed concrete structures and bridge cables.

FIELD OF THE INVENTION

As a rule, soil and rock anchors consist of a tension member made of steel which is connected, on its side which is in the open, to the structure to be supported, and with its end toward the ground to the soil or the rock via an anchoring section. The tension member is assembled either from a single tension element in the form of a rod or a cable or, particularly in anchors with a higher tension force, from a plurality of parallel tension elements. After having been installed in the soil, the anchor is inaccessible, i.e. it is buried in the soil or the rock.

In most cases the material for the tension member is steel and often, particularly in connection with prestressed anchors, a high-strength so-called prestressed steel which is comparatively sensitive. The steel must not fail, because the functionality of the anchor must be maintained. For example, weakening or even snapping of steel tension elements, in particular prestressed steel, can be caused by corrosion, particularly by tensional crack corrosion, which is possible in prestressed tension elements.

A further cause for the decrease in the prestressing force of an anchor is the tension relaxation of the prestressed tension element.

Soil and rock anchors are required to perform their function permanently. With so-called long-term or permanent anchors in particular it is attempted and often required that their functionality be monitored continuously or at regular intervals in order to detect a safety risk in good time.

Monitoring of the tension elements is possible only with great difficulties, if at all, because the anchors are enclosed over practically their entire length, which often can be considerable, by the structure to be supported as well as by the soil or rocks, so that a visual check or a check by means of laterally applied test apparatus is impossible over the length of the tension member. As a rule, the only accessible place of an anchor is the end by which fastening on the open side takes place.

A known method of checking the anchor consists in measuring the anchor strength on the accessible open support. Permanent anchors in particular are often designed at this accessible end in such a way that by means of later connection of a jack the anchoring can be lifted off its support, in the course of which the lift force, which corresponds to the present anchoring force, is measured.

A further possibility of checking the force which is used off and on is to equip the accessible anchoring with a force measuring element, a load cell on an electric, mechanical or hydraulic basis, in order to determine the anchoring force continuously or when needed.

These force checks are comparatively complicated and expensive. If a loss of force is registered, it is often not easy to decide whether the force loss was caused by the failure or giving way of the connection between the anchor and the surrounding construction site or the rock, or by the failure of individual tension elements of the anchor.

It is also easily possible that no great change in the anchor force is registered, even though some tension elements of the anchor have snapped or their cross section was weakened by corrosion. In many cases the remaining and still intact tension elements of the anchor take up the load portions of the failing tension elements. In this case the intact tension elements are loaded to a higher degree with the result that they are also more easily subject to the danger of a failure.

A method for monitoring components is furthermore known from German Patent Publication DE 41 34 787 A1 or European Patent Publication EP 0 264 622 A1, in which beam waveguide sensors are fixedly installed parallel with the tension elements in the jacket covering the tension elements, and changes in damping of the sensor are measured.

A comparable method known from German Patent Publication DE 36 00 034 A1 uses electrically conductive wires in place of the beam waveguide sensors, which are fixedly connected over the entire length of the component to be monitored, wherein the resistance or capacity of the wires is measured.

In this case the sensors are intended to show changes in the extension of, for example, the connecting section of the anchor, wherein the extension changes could be caused by the failure of individual or of all tension elements of the anchor. However, a precise statement regarding the cause of the extension change is not possible with this method. In particular, it is not possible to determine whether individual or all tension elements are corroded or even have snapped.

Almost all of the sensors used for monitoring up to now, such as force measurement transmitters or beam waveguide sensors, have the disadvantage that they are fixedly connected with the anchor. Thus, it is impossible at a later time to check the correct operation of the monitoring elements. It is impossible, in particular, to determine whether changes of the measuring signal are caused by changes of the tension member or changes of the sensors, for example because of long-time changes of the calibrating curve.

OBJECT AND SUMMARY OF THE INVENTION

It is the object of the invention to provide a monitoring device for structural elements, in particular for tension members of soil or rock anchors, compression members of poles, prestressing elements for prestressed concrete structures and bridge cables, which is embodied in such a way that the weakening or failure of the tension member is detected by the monitoring elements themselves, even in cases where essential parts of the construction component are not accessible from the exterior, wherein the sensor is intended to be releasably connected with the structural elements to be monitored in order to make possible a check of the functionality of the sensor.

This object is attained by the invention by the characteristics in accordance with claim 1.

By means of the presence of a sensor, assigned to the metallic tension, compression or prestressed members of the structural elements in a sensor conduit of the structural element to be monitored, it is possible to detect corrosion, overextension or ripping or relaxation of the tension of the individual tension members or tension rods or cables over their entire length.

The sensor can permanently remain in the sensor conduit, or it can be embodied to be insertable into and removable from it only for checking. In this way its operation can be checked and it can be exchanged for a new, intact or improved sensor. The possibility of monitoring over long periods of time is assured in this manner.

In accordance with another embodiment, a movement device which is operated remotely, for example, can be provided for the sensor.

By means of this it is possible in a simple manner to determine the place of the weakening or failure over the entire length of the tension member for every individual tension member.

A highly sensitive magnetic field sensor is employed with a preferred embodiment of the invention, which determines the effect of a magnetic field through the respective tension member.

In this case it is possible to provide at least one transmitting coil which is preferably placed on one end of a tension member to be monitored.

In the preferred embodiment of the invention, a highly sensitive magnetic field sensor in the form of a superconducting quantum interferometer (SQUID) is used.

Signal evaluation is preferably performed by the use of lock-in techniques or by correlation of the respective sensor signal with a reference signal corresponding to the alternating or pulsed magnetic field. It is possible by means of this technique to determine, besides a statement that there is a failure, the place of the failure, too, by evaluating the phase displacement between the reference signal and the respective sensor signal.

This results in the advantage that no more additional path measurements are required.

In this case, this technique for detecting the presence and location of a failure of the structural element to be monitored can, of course, also be used independently of the arrangement of the at least one sensor in a sensor conduit, in that the sensor is disposed, for example, at a structural element which is accessible from the exterior and is sheathed, if required, or that it is moved along its exterior.

Further embodiments of the invention ensue from the dependent claims.

The invention will be described in detail below by means of exemplary embodiments illustrated in the drawings.

BRIEF DESCRIPTION OF THE DRAWINGS

FIG. 7 is a sectional view of a soil anchor with a changed movement device for a sensor, and FIG. 8 is a sectional view along the line VIII—VIII in FIG. 7;

FIG. 9 is a cross-sectional view of a reinforced concrete or prestressed concrete support member;

DETAILED DESCRIPTION OF THE PREFERRED EMBODIMENTS

Figure 1:
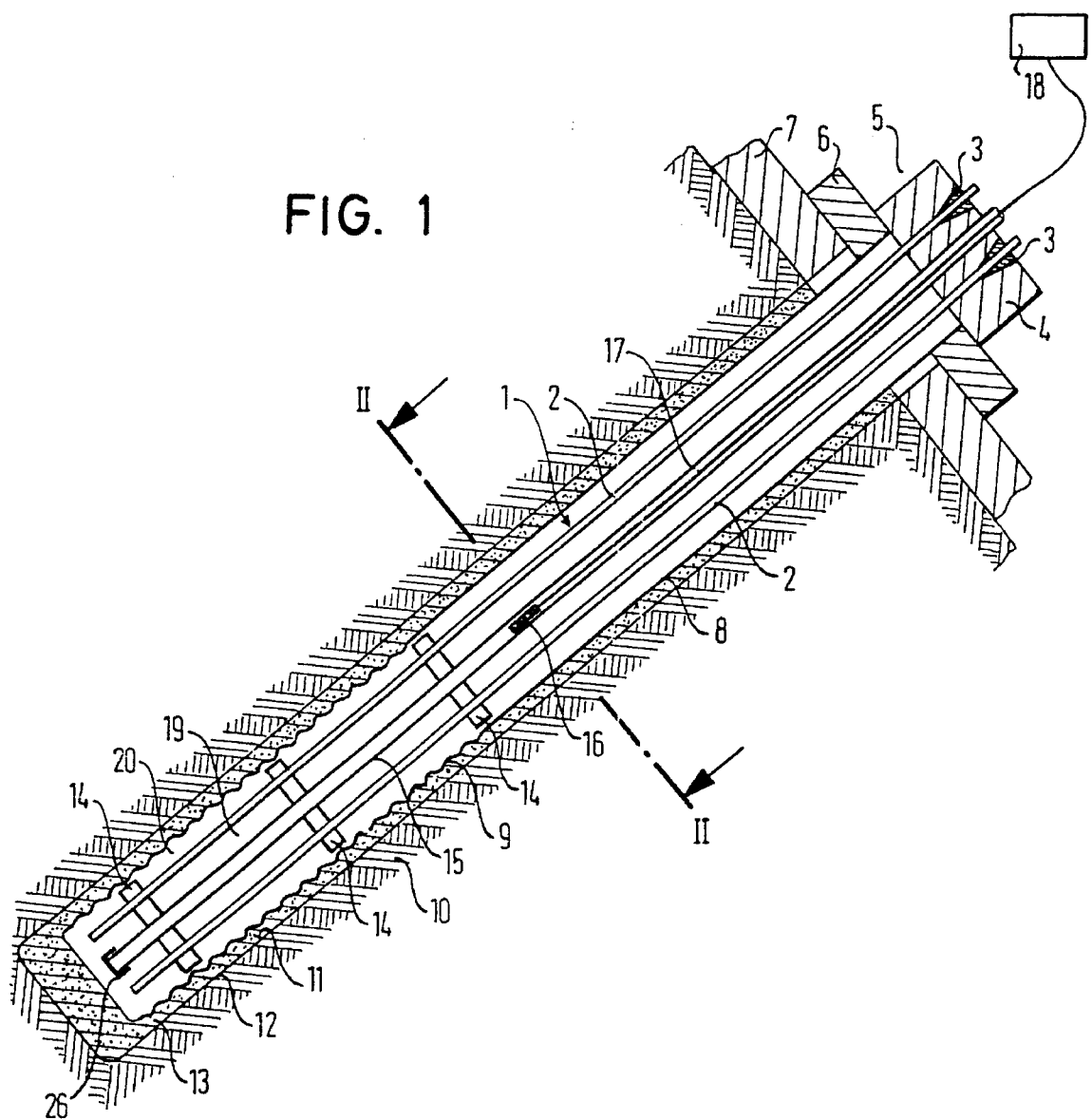
FIG. 1 is a schematic sectional view of a soil anchor with a monitoring device.

The soil or rock anchor of FIG. 1 has, as is customary, a tension member 1 of one or a plurality of tension rods or cables 2. The ends of the tension rods or cables 2 on the open side of the tension rods or cables 2 are fastened, for example by means of clamping wedges 3, in the anchor head 4 of the open anchoring 5. The anchor head 4 is supported on the anchor plate 6 which rests on a component 7, which is to be anchored, for example, and is supported on the top of the ground or rock.

The tension member 1 can be enclosed over the front part of its length by a smooth jacket tube, and over the lower part by a corrugated jacket tube, in the area of which the anchoring force is transmitted via a connection into the surrounding structural site or the rock. The tension member 1, together with the jacket tube 8 and 9, is disposed in a bore hole 11. The annular space between the jacket tube 8, 9 and the bore hole walls 12 is filled with hardened injection mortar 13.

The individual anchor rods or cables 2 can be disposed between spacers 14.

A sensor conduit 15 extends approximately parallel with the anchor rods or cables 2. The sensor conduit 15 can already be formed when the anchor is installed. But it can also be formed later. It is formed by a bore or a tube. The tube is closed at the lower end by a plug 26. Its end toward the open is guided toward the exterior through the anchor head. A sensor 16 is disposed inside the sensor conduit 15. Preferably, this sensor is a highly sensitive magnetic field sensor, a so-called SQUID (superconducting quantum interference detector). Such a sensor 16 can be embodied in the form of a sensor head, comprising a measuring head with a field coil and a pick-up coil. The sensor 16 is displaceable in the sensor conduit 15, for example over the entire length or a partial length of the anchor tension member. Movement of the sensor 16 is provided by means of a movement device 17. This can simultaneously constitute the sensor transmission line. It is connected with a signal processing or evaluation device 18 disposed on the open end outside of the soil anchor. The interior of the jacket tube 8 and 9 in which the anchor rods or cables 2 and the sensor conduit 15 are disposed, is also filled with a hardened filler, for example injection mortar.

Figure 2:
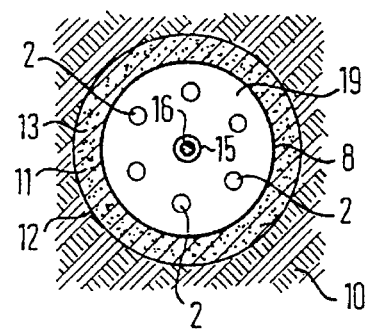
FIG. 2 is a sectional view along the line II—II of FIG. 1.

As shown in FIG. 2, the sensor conduit 15 is essentially centrally disposed and is enclosed by several anchor rods or cables 2 in the form of a circle.

Figure 3:
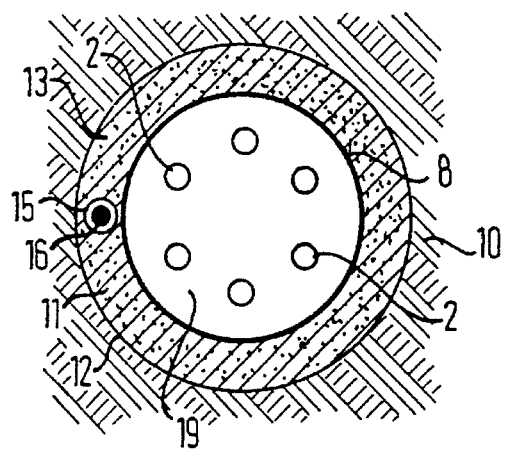
FIG. 3 is a cross-sectional view the same as that in FIG. 2, but with a changed position of the monitoring conduit.

FIG. 3 shows that the sensor conduit 15 with the sensor 16 can also be disposed in the annular space between the jacket tube 8, 9 and the bore hole wall 12.

The sensor employed with the exemplary embodiment of FIG. 1 includes a transmitter coil for the generation of a magnetic field. As can be seen from FIG. 4, it is also possible for the generation of the required magnetic field when using a highly-sensitive magnetic field sensor (SQUID) to dispose the transmitter coil 21 in such a way that it encloses the anchor rods or strands 2 around their base. The electrical supply or relief lines 22, 23 are run to the exterior through the anchor head 4.

Figure 5:
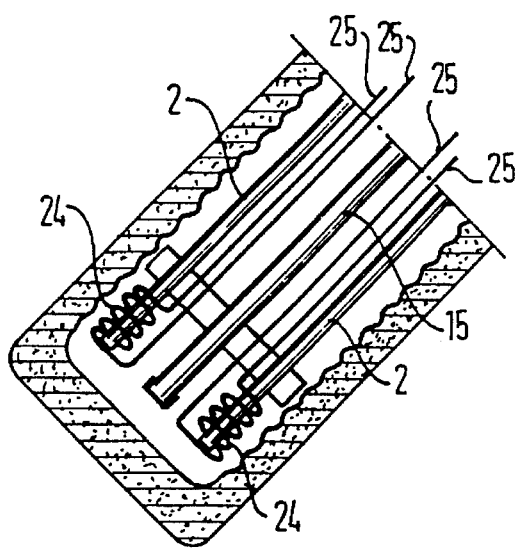
FIG. 5 is a partial sectional view the same as that in FIG. 4 with a plurality of coils generating magnetic fields for one or several sensors.

However, in accordance with FIG. 5 it is also possible to have a transmitter coil 24 enclose respectively each one of the bottom ends of the anchor rods or cables 2, their supply and relief lines 25 again being run to the outside through the anchor head 4. In this case the transmitter coils 24 can be disposed in parallel or series circuits.

Figure 6:
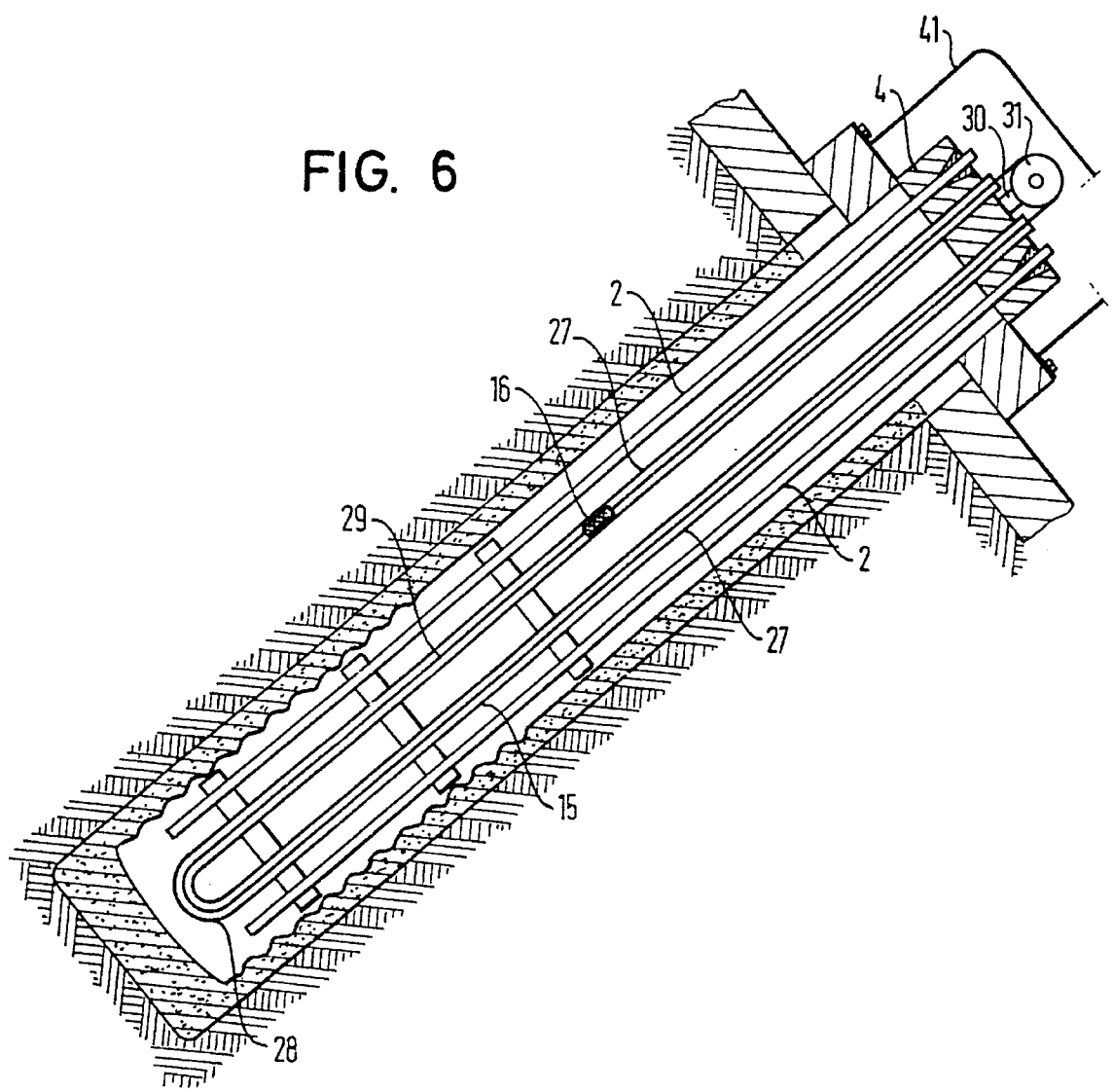
FIG. 6 is a sectional view of a variation of a soil anchor.

In accordance with FIG. 6, the sensor conduit is embodied in a U-shape with two legs 27, which are connected with each other at the bottom by a tube bend 28. The sides of the legs 27 toward the open are run outside through the anchor head 4. There is an endless cable inside the sensor conduit 15, which is reversed at the bottom in the tube bend 28 end toward the open via the roller 31 driven by a motor 30. The sensor 29 is fastened to the cable. It can be embodied as a sensor head. Also, sensor 29 can include transmitter coils 4 or 5, as previously shown in FIGS. 4 or 5, facing the bottom of the bore hole and enclosing the anchor rods or cables 2.

In the embodiment of the soil or rock anchor in accordance with FIG. 7, the inner wall 33 of the sensor conduit 32 is provided with a helical profile which is engaged by the exterior thread 34 of the sensor 35. The sensor 35 is seated displaceably on a shaft 36, with which it can turn and which has an end stop 37 at the bottom. The shaft 36 is driven by means of a motor 39 which is fixed via a support 40 within the anchor head cover 41 in a protected manner. The motor 39 can, for example, be remotely operated by means of electrical lines, not shown.

Figure 4:
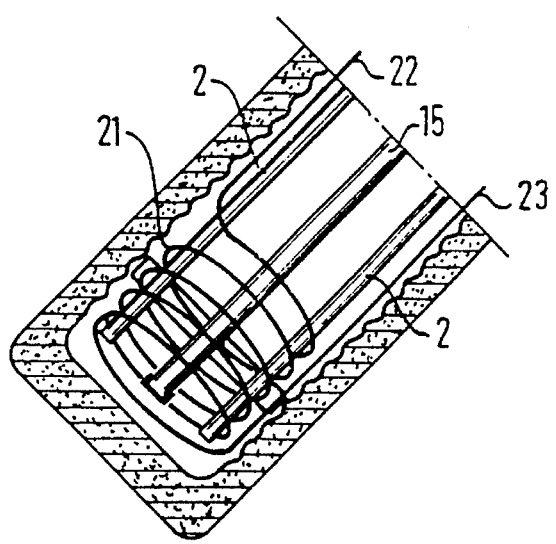
FIG. 4 is a partial sectional view starting at the end in the ground of a soil anchor with a coil generating a magnetic field, for the sensor.

Again, transmitter coils with supply lines in accordance with FIGS. 4 or 5 can be disposed on the anchor base.

It can be seen from FIG. 8 that the sensor conduit 32 is essentially centrally disposed in respect to the anchor rods or cables 2. However, it can also be disposed eccentrically or, in accordance with FIG. 3, outside of the jacket tube 8.

If the anchor tension cable 1 is scanned partially or over its entire length by means of the movement of the sensor 16, it is thereby possible to detect corrosion of the anchor rods or cables 2 and/or crack formation thereon.

It is also possible to dispose the sensor 16 fixedly in the sensor conduit 15, for example in the area of the anchoring section in which the force transmission into the ground takes place. By means of this it is possible to detect loosening, i.e. a displacement of the anchor rods or cables 2 in respect to the sensor 16 and therefore in respect to the surrounding ground 10.

The monitoring device of the invention can also be employed in a similar manner for posts or supports with pole rods or cables.

Finally, it is also possible to dispose the monitoring device in accordance with the instant invention, having a sensor conduit, within a prestressing member or cable or on the outside of a jacket tube of such a prestressing member or cable. It is also conceivable to provide such sensor conduits by themselves in reinforced concrete or a reinforced concrete structure. It is then possible by means of such sensor conduits to check the reinforced concrete steel reinforcement, prestressing members or the like.

FIG. 9 shows a reinforced concrete support member in cross section, in which a sensor conduit 42 has been disposed, from which the prestressing members 43 and the reinforced concrete reinforcement rods 44 can be checked.

It is also possible to associate a data memory with the sensor 16, which stores the sensor signals. Evaluation takes place after the sensor 16 has been taken out of the sensor conduit. In this case a connection line between the sensor 16 and the evaluation device 18 can be omitted.

Finally, instead of being fixed, the transmitter coils 21 or 24 can also be provided movable in the sensor conduit 15, for example prior to a check of the tension, compression or prestressing members. They can be provided so they move ahead of the sensor 16 or they are moved through the sensor conduit 15 separately from the sensor 16. After removal of the transmitter coil, the sensor 16 can be inserted into the sensor conduit 15 ant moved about in it.

Figure 10:
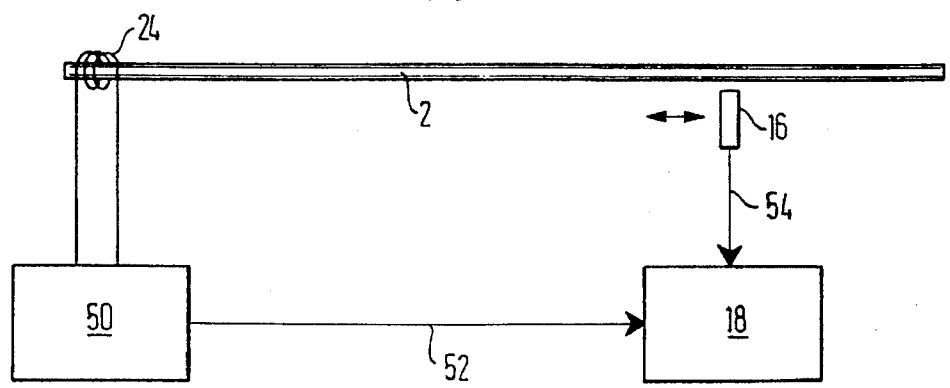
FIG. 10 is a block diagram of a preferred possibility for signal evaluation.

A preferred embodiment of a signal evaluation is illustrated in FIG. 10 by means of an example of a transmitter coil 24 disposed at the end of an individual element 2 of a structural element 1 which is to be monitored. The representation of elements unimportant for signal evaluation was omitted in FIG. 10.

The transmitter coil 24 is supplied with an alternating or pulse-shaped current by a transmitter unit 50, and the coil 25 generates a corresponding alternating or pulsed magnetic field.

The transmitter unit 50 simultaneously supplies the evaluation device 18 with a reference signal 52 which corresponds to the alternating or pulse-shaped current, so that the evaluation device 18 can utilize the information content of this signal for processing and evaluation of the corresponding sensor signal 54.

An induction coil or a highly sensitive superconducting quantum interferometer (SQUID) is preferably used as the magnetic sensor, which is disposed displaceably parallel to the longitudinal axis of the structural component to be monitored, as shown in FIG. 10. In particular, the sensor can be embodied in such a way that the radial or axial component of the magnetic field or their gradients are measured.

The use of the lock-in technique (phase-locked filter) or a correlation of the signals B2 and 54 in particular offer themselves for signal evaluation. In both applications it is possible to determine the distance between the sensor 16 and the transmitting coil 24 and thus, with the location of the transmitter coil 24 known, the respective location of the sensor 16 from the phase information of the two signals.

To correlate the signals 52 and 54 in real time it is possible to use a vector signal processor, for example, which provides sufficient computing capacity for performing the elaborate numerical operations.

Besides these more expensive methods for signal evaluation it is of course also possible to perform only narrowband filtering of the sensor signal S4 by means of the evaluation device 18. The middle frequency of the filter in this case must essentially correspond to the base frequency or the harmonic frequency of the alternating or pulsed magnetic field. However, a determination of the location is not possible in the manner described above. For this, the movement of the sensor, for example, must be detected additionally.

These methods for signal evaluation can be transferred in an analogous manner to every above described arrangement of transmitter coil(s) and sensor(s). These methods are not restricted to the arrangement of the sensors in a sensor conduit, but are independently usable in those cases, too, where the structural component to be monitored or its sheathing or jacket are accessible from the outside, so that the sensor can be moved paraxially along the outer circumference of the sheathing or the jacket.

What is claimed is:

1. A monitoring device for structural elements contained within an opening in an overall structural arrangement, said structural elements being for tension members of ground anchors, pole compression members, prestressing elements for prestressed concrete structures, and bridge cables comprising:

conduit means defining a bore, extending substantially parallel to said structural elements within the overall structural arrangement, said structural elements located within said opening, said bore including a sensor conduit;

sensor means for producing at least one sensor signal within said sensor conduit, said sensor means being movably mounted within said sensor conduit; and evaluation means for receiving and processing said at least one sensor signal responsive to changes in said structural elements.

2. The device of claim 1, wherein said sensor conduit includes an inner wall which comprises a guide for said sensor means.

3. The device of claim 1, wherein said sensor means includes an inner wall in which threads are formed.

4. A device for monitoring a structural element, comprising:

sensor means for producing at least one sensor signal;

conduit means disposed in proximity to the structural element for receiving said sensor means, said sensor means being movable within said conduit means; and evaluation means for receiving and processing said at least one sensor signal, whereby to evaluate the structural element;

said conduit means being U-shaped and comprising first and second legs interconnected by a tube bend.

5. The device of claim 4, wherein said conduit means has an open end, said device further comprising an anchor head located in proximity to said open end of said conduit means, said first and second legs extending through said anchor head.

6. The device of claim 4, further comprising an endless element guided within said conduit means, a motor, and a driven reversing roller, said endless element being driven by said motor via said driven reversing roller.

7. A monitoring device for structural elements contained within an opening in an overall structural arrangement, said structural elements being for tension members of ground anchors, pole compression members, prestressing elements for prestressed concrete structures, and bridge cables comprising:

conduit means defining a bore, extending substantially parallel to said structural elements within the overall structural arrangement, said structural elements located within said opening, said bore including a sensor conduit;

sensor means for producing at least one sensor signal within said sensor conduit, said sensor means being movably mounted within said sensor conduit;

evaluation means for receiving and processing said at least one sensor signal responsive to changes in said structural elements; and wherein said sensor conduit means and said sensor means are threadably interconnected.

8. The device of claim 7, further comprising a spindle on which said sensor means is disposed, and motor means for driving said spindle, thereby movably displacing said sensor means.

9. A monitoring device for structural elements contained within an opening in an overall structural arrangement, said structural elements being for tension members of ground anchors, pole compression members, prestressing elements for prestressed concrete structures, and bridge cables comprising:

conduit means defining a bore, extending substantially parallel to said structural elements within the overall structural arrangement, said structural elements located within said opening, said bore including a sensor conduit;

sensor means for producing at least one sensor signal within said sensor conduit, said sensor means being movably mounted within said sensor conduit means;

evaluation means for receiving and processing said at least one sensor signal responsive to changes in said structural elements; and wherein said evaluation means includes a data memory connected to said sensor means for receiving and storing said at least one sensor signal.

10. A monitoring device for structural elements contained within an opening in an overall structural arrangement, said structural elements being for tension members of ground anchors, pole compression members, prestressing elements for prestressed concrete structures, and bridge cables comprising:

conduit means defining a bore, extending substantially parallel to said structural elements within the overall structural arrangement, said structural elements located within said opening, said bore including a sensor conduit;

sensor means for producing at least one sensor signal within said sensor conduit, said sensor means being movably mounted within said sensor conduit;

evaluation means for receiving and processing said at least one sensor signal responsive to changes in said structural elements; and wherein said sensor means includes at least one transmitter coil and at least one magnetic field sensor, said at least one transmitter coil generating a magnetic field, variations in which are detected by said at least one magnetic field sensor.

11. The device of claim 10, wherein said at least one transmitter coil is disposed at one end of the structural element separate from said magnetic field sensor.

12. The device of claim 10, wherein said at least one transmitter coil is fastened to said at least one magnetic field sensor.

13. The device of claim 10, wherein said at least one transmitter coil is movable in said sensor means.

14. The device of claim 10, further comprising transmitter means operatively associated with said at least one transmitter coil for generating one of an alternating magnetic field and a pulsed magnetic field.

15. The device of claim 14, wherein said evaluation means comprises a filter unit having a middle frequency substantially corresponding to one of a base frequency and a harmonic frequency of one of an alternating magnetic field and a pulsed magnetic field.

16. The device of claim 14, wherein said transmitter means supplies a reference signal to said evaluation means, said reference signal corresponding to the magnetic field generated by said transmitter means, said evaluation means including one of a lock-in amplifier and a correlator.

17. The device of claim 10, wherein said at least one magnetic field sensor comprises one of an induction coil and a superconducting quantum interferometer, said at least one magnetic field sensor measuring one of a radial component and an axial component of one of a pulsed magnetic field, an alternating magnetic field, and the gradients thereof.

18. The device of any one of claims 1, 4, 7, 9 or 10, said sensor means comprising a plurality of sensors, and said sensor conduit means comprising a plurality of conduits, one for each of said sensors.

19. The device of any one of claims 1, 4, 7, 9 or 10, said sensor means comprising at least one sensor movable in said sensor conduit over at least a partial length of the structural element.

20. The device of any one of claims 1, 4, 7, 9 or 10, said sensor means comprising a plurality of sensors, each of said sensors monitoring the structural element.

21. The device of any one of claims 1 or 10, wherein the structural element comprises a plurality of individual elements, said sensor means comprising a plurality of sensors, each of said sensors monitoring a respective one of said individual elements.

22. The device of any one of claims 1, 7 or 10 wherein a plurality of individual elements is contained with the overall structural arrangement, said sensor means comprising a plurality of sensors, each of said sensors monitoring a respective one of said individual elements.

23. The device of claim 10, wherein the structural element comprises at least two individual elements which are magnetically short-circuited at at least one end thereof.

* * * * *